United States Patent [19]
Nakadozono et al.

[11] Patent Number: 4,872,415
[45] Date of Patent: Oct. 10, 1989

[54] METER FOR A VEHICLE

[75] Inventors: Hiroshi Nakadozono; Yusuke Mori, both of Kanagawa, Japan

[73] Assignee: Nissan Motor Company, Limited, Yokohama, Japan

[21] Appl. No.: 146,863

[22] Filed: Jan. 22, 1988

[30] Foreign Application Priority Data

Jan. 23, 1987 [JP] Japan .................. 62-14922

[51] Int. Cl.⁴ ............................ G01D 11/28
[52] U.S. Cl. ..................... 116/288; 362/26
[58] Field of Search ........... 116/288, 287, 286; 362/26; 73/293, 499, 866.3

[56] References Cited

U.S. PATENT DOCUMENTS

| 3,033,155 | 5/1962 | Beckman | 116/288 |
| 3,559,616 | 2/1971 | Protzmann | 116/288 X |
| 4,218,726 | 8/1980 | Fukasawa et al. | 116/288 X |
| 4,252,078 | 2/1981 | Fukasawa et al. | 116/288 |
| 4,258,643 | 3/1981 | Ishikawa et al. | 116/286 |

FOREIGN PATENT DOCUMENTS

| 3300270 | 2/1984 | Fed. Rep. of Germany | 116/286 |
| 3347014 | 7/1985 | Fed. Rep. of Germany | 116/288 |
| 2004065 | 3/1969 | United Kingdom | 116/288 |
| 2015161 | 9/1979 | United Kingdom | 116/288 |
| 2024426 | 1/1980 | United Kingdom | 116/288 |

Primary Examiner—Tom Noland
Attorney, Agent, or Firm—Pennie & Edmonds

[57] ABSTRACT

A meter is disclosed wherein a light source is disposed behind the face thereof. A light path from the light source is defined in part by a reflective surface on the needle which directs light from the light source onto a portion of the face that is in the immediate vicinity of the needle. The reflecting surface is opaque which causes the needle to appear as a silhouette over the illuminated portion of the face.

8 Claims, 1 Drawing Sheet

METER FOR A VEHICLE

BACKGROUND OF THE INVENTION

The present invention relates generally to the construction of a meter for a vehicle. More specifically, the invention relates to an analog meter having a single light source for illuminating a face thereof. The present invention may be embodied, for example, in a speedometer, a tachometer, a fuel gauge, a temperature gauge, or so forth for a vehicle, but it will be appreciated that it is also useful in other applications.

A Japanese Utility Model First Publication (Jikkaisho) No. 60-37820 exemplifies a conventional meter for a vehicle.

The above conventional meter comprises an opaque face on which characters, marks, or the like are printed, a needle having a shaft which is inserted into a hole in the face and rotatably supports the needle, a light source disposed within the meter, behind the face, and a light-guide plate for guiding light emitted from the light source into the needle through a hole in the face, the plate being located on the interior of the face.

The needle further comprises a body which points toward the characters or the marks on the face and a reflecting portion which is made of luminous paint. The reflecting portion is formed by a coating on the body. The light led through the light-guide plate is reflected from the reflecting portion toward the outside of the meter. Thus, the needle is caused to glow and can easily be identified.

In the conventional meter, the needle can be seen in the dark by its own glow. But the characters and the marks printed on the face can not be visually identified thereby and therefore another lighting means is required for illuminating them. Thus, the construction of the meter becomes complex, thereby causing the manufacturing cost to increase.

If another lighting means is provided for lighting the face, the characters and the marks of the entire face are illuminated. As a result, the light from illuminated characters and marks may be reflected from the side windows of the vehicle, in such a way as to interrupt the visual field or to make observation through the side windows difficult. Accordingly, an improved meter for solving the above problems has been desired.

SUMMARY OF THE INVENTION

It is an object of the present invention to provide an improved meter which does not require separate lighting means for exclusively illuminating characters and marks printed on the face of the meter.

It is another object of the invention to provide a meter which does not generate a large reflection, which would interrupt the visual field in the peripheral windows of a vehicle, with its lighting.

In order to accomplish the aforementioned objects, in a meter according to the invention, there is provided a lighting arrangement which makes the characters, marks, and so forth, along with a needle or movable indicator, visible by means of illumination provided by a single light source.

In the preffered construction, the lighting arrangment is to be designed to illuminate a limited area of the meter face so that the reflection of the illuminated portion of the meter in the side windows is not so large as to interfere with the view through the side windows. Therefore, the field of vision from the peripheral windows is clearer.

In practical construction, there is provided a meter which comprises a face on which characters and marks are printed, a needle for indicating them and having a pin which rotatably supports it, and a light source for illuminating the face so as to enable an operator to identify the characters and marks indicated by the needle within a dark vehicular cabin. Furthermore, the needle has an opaque reflecting portion for reflecting light from the light source onto the face, which causes the image of the needle to appear as a silhouette.

Preferably, the reflecting portion which is made of an opaque reflective paint is provided at the opposite side of the needle from the face and reflects the light transmitted from the light source so as to illuminate a position of the face around the needle.

With the construction of the meter, it is not necessary to provide another lighting means for exclusively illuminating characters and marks on the face of a meter. Accordingly, manufacturing cost can be reduced.

DESCRIPTION OF THE PREFERRED EMBODIMENT

Figure 1:
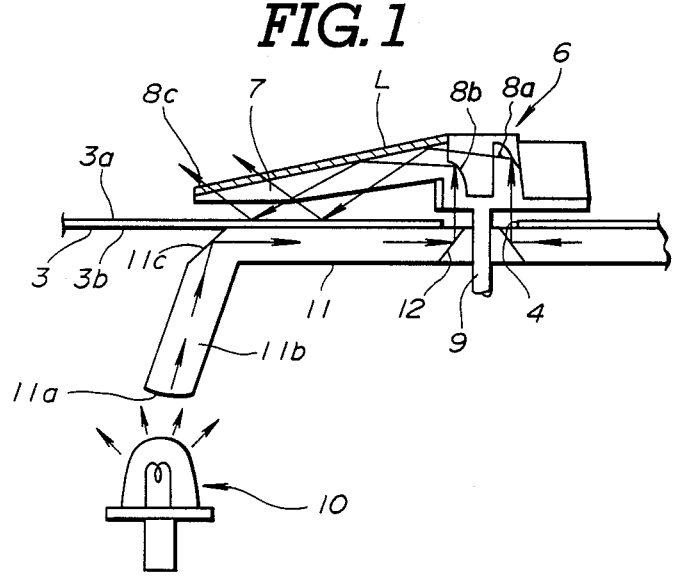
FIG. 1 is a sectional view showing a meter of a preferred embodiment according to the present invention.
Figure 2:
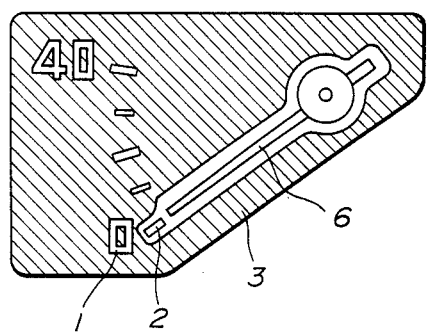
FIG. 2 is the front view of the meter shown in FIG. 1.

Referring now in detail to FIGS. 1 and 2 of the drawings, there is shown the preferred embodiment of a meter according to the present invention. The meter includes a face 3, on which characters 1 and marks 2 are provided, and a needle 6 for seleceively pointing towards characters 1 and marks 2 on the needle face. As can be seen in FIG. 1, the face 3 has a through hole 4. The needle 6 comprises a journaling pin 9 which is inserted into the hole 4 and rotatably supports the needle. A light source 10 for emitting an illuminating light. The light source 10 comprises a lamp provided behind the face. A light-guide 11 is also provided on the inside surface 3a of the face and is associated with the light source for guiding light to the needle. The light-guide 11 is an optically conductive material formed into an annular disk configuration. The light-guide 11 has a downward extension 11b whose lower end opposes the light source 10. The light-guide 11, extending parallel to the face 3, has a deflector edge 11c obligue to the major plane of the light-guide and to the extension 11b so that the light received by the end 11a of the extension is deflected in a direction parallel to the major plane of the light-guide.

The light-guide 11 further has another deflector edge 12 defined by the periphery of a center opening of the light-guide. The deflector edge 12 extends oblique to the major plane of the light-guide 11 and the axis of the journaling pin 9 so that the light passing through the light-guide is deflected in a direction parallel to the pin 9. The light deflected by the deflector edge 12 passes through the hole 4. The diameter of the upper edge of the center opening is smaller than that of the hole 4. A flat surface of the light-guide immediately surrounding the deflector edge 12 directly faces the needle 6 through the hole 4 so that the light reflected by the deflector edge 12 is guided through the hole 4, onto the bottom of the needle 6. An optical tube which guides light from the light source 10 to the reflecting portions 8a and 8b can be used instead of the light-guide 11. The needle 6 includes a body 7 which is made of transparent material and reflecting portions 8a, 8b, and 8c. The body 7 can be rotated with the pin 9 to selectively indicate any of the characters 1 and marks 2 on the face 3. The reflecting portions 8a, 8b, and 8c are formed by a coating of opaque reflective paint. The reflectors 8a and 8b are provided within the body facing the deflector edge 12 to reflect light passing from the deflector edge 12 through the hole 4 toward the deflector 8c. However, a single reflector having an angle of reflection for reflecting light from the light-guide toward the entire reflecting portion 8c can be provided within the body. The reflector 8c is provided on the opposite surface of body 7 from that which faces the face 3. Thus, light L from the source 10 which is led through the light-guide 11 is reflected onto the face 3 by the reflecting portions 8a, 8b, and 8c.

In operation, the light L emitted from the light source 10 enters into the extension 11b from the end 11a thereof. The light is, then, reflected by the deflector edge 11c to concentrate at the deflector edge 12 through the light-guide 11. The light concentrated on the deflector edge 12 is reflected thereby through the hole 4 onto the reflecting portions 8a and 8b of the needle 6. The light is, then, reflected by the reflecting portions 8a and 8b towards the reflecting portion 8c and is, then reflected again by the reflecting portion 8c onto the face 3 to illuminate the characters or marks. The light is further reflected by the surface 3a to the viewer which causes the image of the needle 6 to appear as a silhouette against an illuminated portion of the surface 3a of the face 3. In addition, since the characters 1 and the marks 2 are illuminated by the light from the needle 6, information shown on the face 3 such as vehicular speed can be perceived without any additional light source other than the light source 10.

It will be appreciated that modifications may be made in the present invention. For example, in above embodiment, the meter which has a rotatable needle mounted on a shaft has been described, but the present invention can be embodied in a fuel gauge, provided in the instrument panel for an automobile, having a needle displaceable between marks printed on a face thereof to selectively indicate any of them wherein the needle's horizontal orientation is constant. In such a modification the deflector edge 12 provided in the light-guide 11 takes the form of a tapered slot in which a shaft supporting the needle may move. A cover is preferably provided over the tapered slot so as to prevent light from the surface of the light-guide from shining toward the viewer. With regard to modifications of the light source for illuminating the face, for example, an LED can be provided within the body 7 in stead of disposing the light source 10 behind the face. Leads of the light source can be connected to a power supply through the pin 9. The reflecting portion may include light transmitting portions which would appear as bright points on the needle.

What is claimed is:

1. A meter for a vehicle comprising:
   an opaque face;
   light means;
   a needle for selectively pointing toward a portion of said face, said needle being made of light transmitting material, associated with said light means, and having a shaft which movably supports said needle; and
   a reflecting section, provided on said needle, for reflecting light emitted from said light means onto said face so as to illuminate a predetermined area around said portion of the face.

2. A meter as set forth in claim 1, wherein said reflecting portion is provided on an opposite side of said needle from said face.

3. A meter as set fourth in claim 1, wherein said reflecting portion is made of an opaque reflective paint.

4. A meter for a vehicle comprising:
   an opaque face;
   a light source disposed behind said face;
   a needle for selectively pointing toward a portion of said face, said needle being made of light transmitting material and transmitting light emitted from said light source;
   a light-guide for guiding light from said light source onto said needle; and
   a reflecting section, provided on said needle, for reflecting said light guided from said light-guide through said needle onto said face so as to illuminate a predetermined area of the face around said needle so as to cause said needle to appear as a silhouette against said illuminated area.

5. A meter as set forth in claim 4, wherein said light-guide having a deflector for deflecting light through said light-guide toward said needle.

6. A meter as set forth in claim 4, wherein said reflecting section is provided on an opposite side of said needle from said face.

7. A meter as set forth in claim 4, wherein said needle includes a first reflecting section and a second reflecting section, said first section reflecting light guided through said light-guide toward said second section, said second section reflecting said light reflected by said first section onto the face.

8. A meter for a vehicle comprising:
   an opaque face;
   light source disposed behind said face;
   a needle for selectively pointing toward a portion of said face, said needle being made of light transmitting material and transmitting light emitted from said light source;
   light-guide means for guiding light from said light source onto said needle; and
   a reflecting section, provided on the side of said needle furthest from said face, for reflecting said light guided from said light-guide means through said needle onto said face so as to illuminate a predetermined area of the face around said needle so as to cause said needle to appear as a silhouette against said illuminated area.

* * * * *